(12) United States Patent
Thybo

(10) Patent No.: US 8,960,213 B2
(45) Date of Patent: Feb. 24, 2015

(54) METHOD FOR OPERATING A VALVE

(75) Inventor: Claus Thybo, Soenderborg (DK)

(73) Assignee: Danfoss A/S, Nordborg (DK)

( * ) Notice: Subject to any disclaimer, the term of this patent is extended or adjusted under 35 U.S.C. 154(b) by 293 days.

(21) Appl. No.: 13/259,377

(22) PCT Filed: Mar. 26, 2010

(86) PCT No.: PCT/DK2010/000039
§ 371 (c)(1),
(2), (4) Date: Dec. 2, 2011

(87) PCT Pub. No.: WO2010/121614
PCT Pub. Date: Oct. 28, 2010

(65) Prior Publication Data
US 2012/0068097 A1    Mar. 22, 2012

(30) Foreign Application Priority Data
Apr. 1, 2009  (DK) .......................... PA 2009 00439

(51) Int. Cl.
*F16L 55/055* (2006.01)
*F16K 47/02* (2006.01)
(Continued)

(52) U.S. Cl.
CPC ............. *F16K 47/023* (2013.01); *F16K 11/074* (2013.01); *F25B 41/062* (2013.01)
USPC .............................................. 137/1; 251/208

(58) Field of Classification Search
CPC ..... F16K 47/023; F16K 11/074; F16L 55/055
USPC ........................................ 137/1; 251/205, 208
See application file for complete search history.

(56) References Cited

U.S. PATENT DOCUMENTS 1,704,392 A * 3/1929 Larner .......................... 137/220
2,991,796 A * 7/1961 Griswold ...................... 137/489
(Continued)

FOREIGN PATENT DOCUMENTS

FR      638793      6/1928
FR      736503      11/1932
(Continued)

OTHER PUBLICATIONS

International Search Report for Serial No. PCT/DK2010/000039 dated Aug. 9, 2010.

*Primary Examiner* — Craig Schneider
*Assistant Examiner* — Frederick D Soski
(74) *Attorney, Agent, or Firm* — McCormick, Paulding & Huber LLP

(57) ABSTRACT

A valve including a first valve part with at least one opening and a second valve part with at least one opening. The relative position of the openings of the first and second valve parts produces an overlapping area, which defines an opening degree of the valve. The first and second valve parts are adapted to perform relative movements from a position defining a maximum opening degree of the valve towards a position defining a minimum opening degree of the valve in such a manner that the velocity of the relative movement between the first valve part and the second valve part varies as a function of the overlapping area of the openings of the first and second valve parts. For example, the velocity may be decreased as the overlapping area decreases. Operating the valve in this manner reduces water hammering while ensuring appropriate operation and acceptable response times.

3 Claims, 8 Drawing Sheets

(51) Int. Cl.
*F16K 5/12* (2006.01)
*F16K 11/074* (2006.01)
*F25B 41/06* (2006.01)

(56) References Cited

U.S. PATENT DOCUMENTS

| | | | | |
|---|---|---|---|---|
| 3,011,754 | A | * | 12/1961 | Ander .............................. 251/81 |
| 3,735,777 | A | * | 5/1973 | Katzer et al. ................ 137/514.5 |
| 3,951,568 | A | * | 4/1976 | Carlson, Jr. .................... 417/27 |
| 4,121,618 | A | | 10/1978 | Sweeney |
| 4,633,904 | A | * | 1/1987 | Schumann et al. ...... 137/625.15 |
| 4,854,344 | A | * | 8/1989 | Schnipke ..................... 137/606 |
| 5,213,124 | A | * | 5/1993 | Costa ............................... 137/1 |
| 5,961,051 | A | * | 10/1999 | Matsui et al. ............. 239/533.1 |
| 6,098,644 | A | * | 8/2000 | Ichinose ........................... 137/1 |
| 6,254,057 | B1 | * | 7/2001 | Pubben et al. .................. 251/45 |
| 6,396,404 | B1 | * | 5/2002 | McHugh ...................... 340/606 |
| 6,895,986 | B2 | * | 5/2005 | Wieder .......................... 137/14 |
| 2002/0175304 | A1 | | 11/2002 | Moeller et al. |
| 2005/0205819 | A1 | * | 9/2005 | Morrison ................. 251/129.13 |

FOREIGN PATENT DOCUMENTS

| | | |
|---|---|---|
| GB | 850338 | 10/1960 |
| WO | 2008/154919 A2 | 12/2008 |

\* cited by examiner

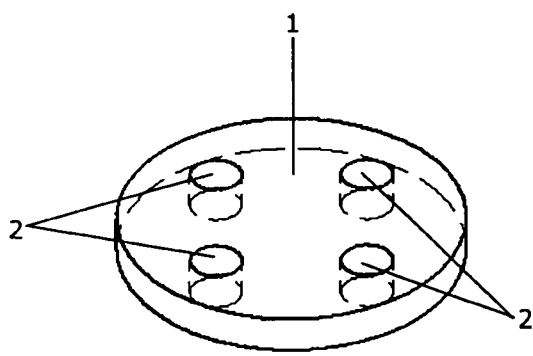
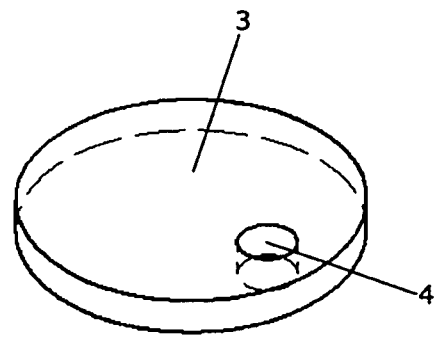
Fig. 1a                    Fig. 1b
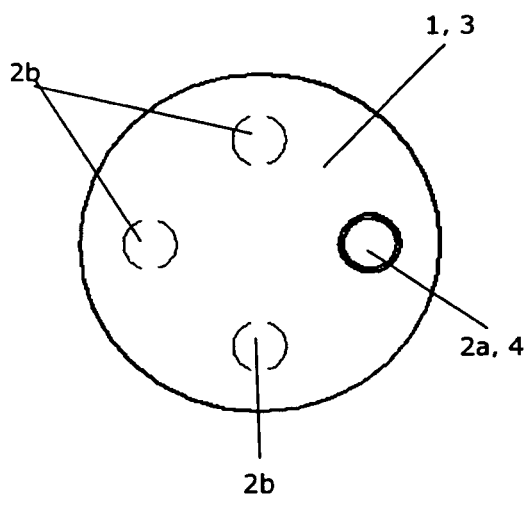
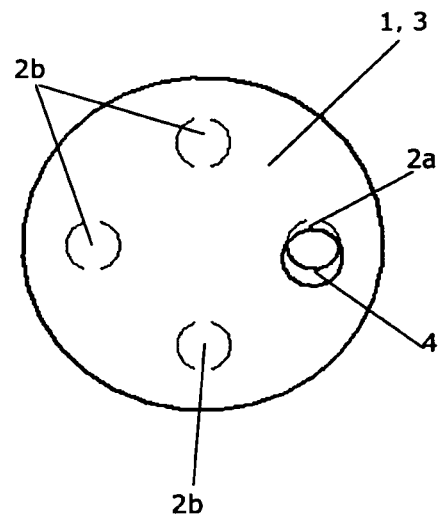
Fig. 2a                    Fig. 2b

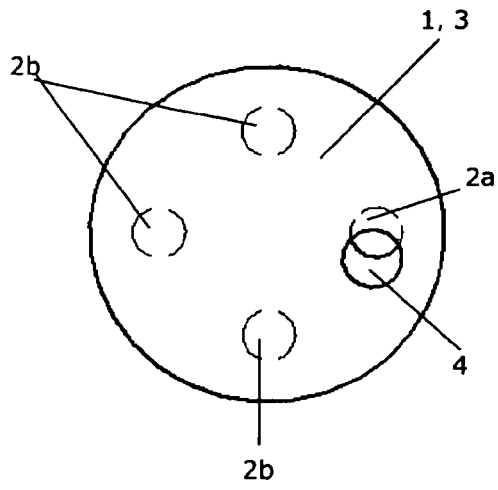
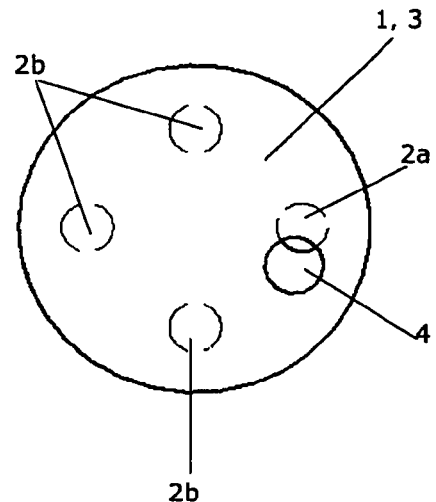
Fig. 2c          Fig. 2d
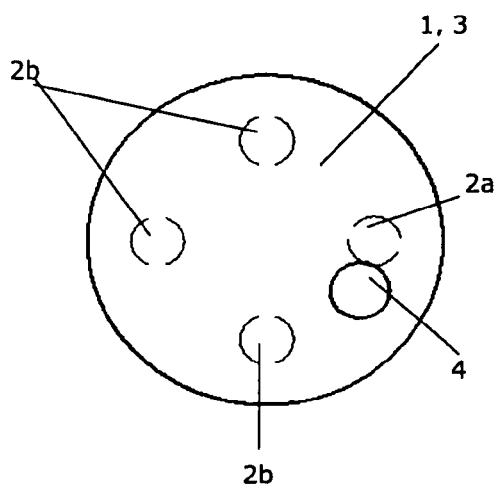
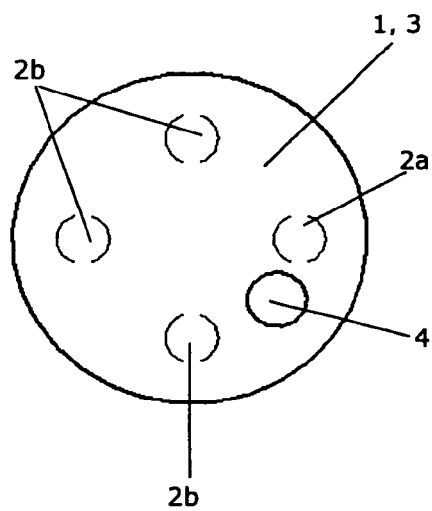
Fig. 2e          Fig. 2f

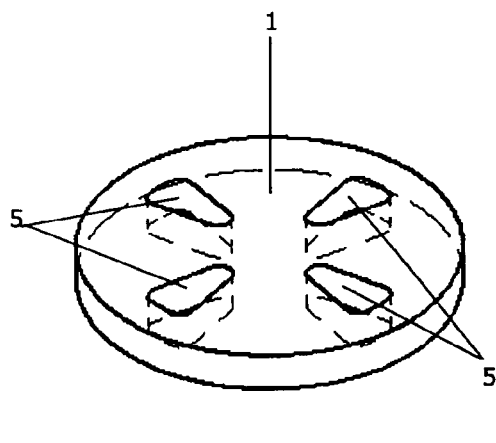
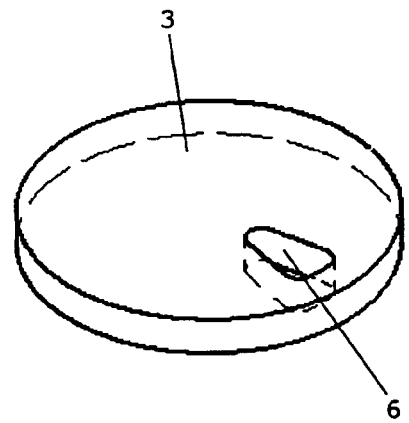
Fig. 3a                    Fig. 3b
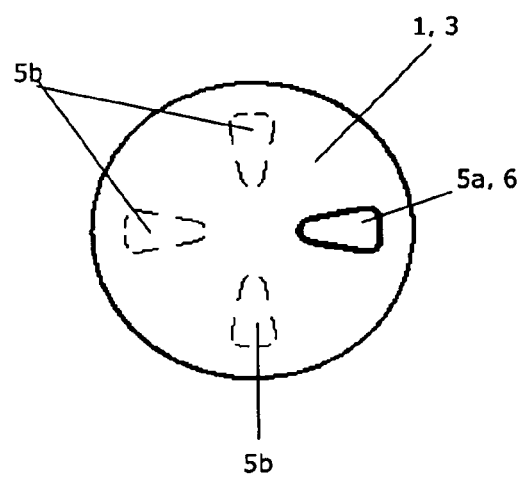
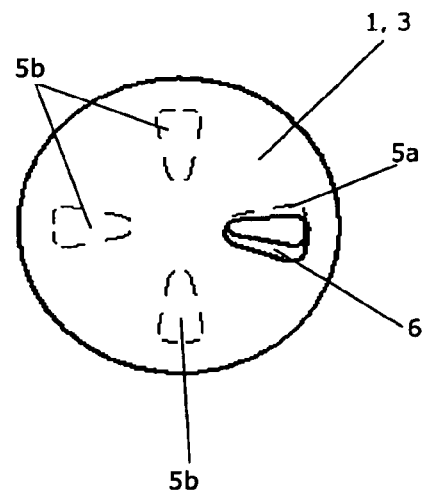
Fig. 4a                    Fig. 4b

METHOD FOR OPERATING A VALVE

CROSS REFERENCE TO RELATED APPLICATIONS

This application is entitled to the benefit of and incorporates by reference essential subject matter disclosed in International Patent Application No. PCT/DK2010/000039 filed on Mar. 26, 2010 and Danish Patent Application No. PA 2009 00439 filed Apr. 1, 2009.

FIELD OF THE INVENTION

The present invention relates to a method for operating a valve, in particular a valve for a use in a refrigeration system. More particularly, the method of the present invention allows the valve to be operated in such a manner that pressure pulsations in a fluid system having the valve inserted therein, are considerably reduced, or even eliminated.

BACKGROUND OF THE INVENTION

When a valve of a fluid system is closed, the abrupt stop of the fluid flow creates a reverse flow in the system. The reverse flow causes pulsating high pressure shock waves or transients. The shock waves generate a banging noise and vibrations of the pipes of the fluid system. This is known as 'water hammer'. The banging noise is undesirable, in particular in fluid systems where valves are repeatedly opened and closed. Furthermore, the vibrations may cause damage to the pipes and/or to other parts of the fluid system.

It is known that water hammer can be reduced by closing the valve slowly. However, in some cases it is not possible, or at least inconvenient or improper, to simply close the valve sufficiently slowly to prevent or reduce water hammering, e.g. because proper operation of the valve requires that it is closed with a certain speed.

WO 2008/154919 discloses a valve where a correspondence between opening degree of the expansion valve and mutual position of the first valve part and the second valve part may be defined by a geometry of the first valve part and/or a geometry of the second valve part. Such a geometry may be or comprise size and/or shapes of openings defined in the first and/or second valve part, size and/or shape of valve elements/valve seats formed on the first and/or second valve parts, and/or any other suitable geometry. WO 2008/154919 does not disclose the problem of water hammering.

U.S. Pat. No. 4,121,618 discloses a mining machine removes coal in the ordinary manner with a plurality of digger elements and conveys dislodged coal into a crusher element, for example. The material, once crushed, falls in the direction of arrows into slurry hopper. The material in slurry hopper is mixed with water and removed by a pump and discharged to an outlet line, where it is transported to the surface of the mine, for example. U.S. Pat. No. 4,121,618 furthermore discloses, that one of the basic problems with the system as above constructed is the excessive water hammer which developed when control valve was rapidly closed as was necessary in order to prevent overflow of water from hopper. U.S. Pat. No. 4,121,618 does not disclose the problem of water hammering in relation to refrigeration systems and specific solutions to preventing water hammering in refrigeration systems. The valve of U.S. Pat. No. 4,121,618 is suited for a mining machine, not for a refrigeration system being very different to a mining machine.

U.S. Pat. No. 5,983,937 discloses a flow control device which is capable of reducing water hammer. The flow control device comprises first to third openings formed stepwise in a rotor side wall portion of a flow control valve disposed in a hot water circuit. Third positions (a) and (b) are established between a first position in which a first communication passage for communication between inlet and outlet pipes of the flow control valve is fully closed and a second position in which the first communication passage is fully open. A duty control is performed so that the rotor reciprocates repeatedly among the above four positions. Thus, the flow control device has been modified in order to allow water hammering to be reduced.

SUMMARY OF THE INVENTION

It is, thus, an object of the invention to provide a method for operating a valve in such a manner that water hammering is considerably reduced as compared to prior art methods, while maintaining an acceptable response time of the valve.

It is a further object of the invention to provide a method for operating a valve in such a manner that water hammering is considerably reduced, without requiring modifications to the valve or the fluid system having the valve inserted therein.

The invention provides a method for operating a valve for a refrigeration system, the valve comprising a first valve part having at least one opening formed therein and a second valve part having at least one opening formed therein, the first valve part and the second valve part are in the form of a substantially circular disk with relative movements being rotational, wherein at least one of the circular disks can rotate about an axis extending through the center of each of the circular disks, the first and second valve parts being adapted to perform relative movements, the relative position of the opening(s) of the first valve part and the opening(s) of the second valve part defining an opening degree of the valve by means of an overlapping area of an opening of the first valve part and an opening of the second valve part, the method comprising the steps of:

moving the first valve part and/or the second valve part from a position defining a maximum opening degree of the valve towards a position defining a minimum opening degree of the valve in such a manner that the velocity of the relative movement between the first valve part and the second valve part varies as a function of an overlapping area between an opening of the first valve part and an opening of the second valve part, in such a manner that the velocity is decreased as the overlapping area decreases; and increasing the relative velocity after the position defining a minimum opening degree has been reached until the valve parts reaches a next position where opening of the valve can be initiated;

wherein the step of moving the first valve part and/or the second valve part comprises the steps of:

varying the velocity in a stepwise manner by moving the first valve part and/or the second valve part at a first relative velocity ($v_1$) until a predefined overlapping area is reached; and subsequently moving the first valve part and/or the second valve part at a second relative velocity ($v_2$) until the overlapping area is zero, the valve thereby being in a closed position;

wherein the second relative velocity ($v_2$) is significantly lower than the first relative veloctiy ($v_1$); and wherein the predefined overlapping area is within the interval from 40% to 80% of a maximum overlapping area.

The valve being operated by means of the method of the invention may advantageously be arranged in a fluid system in such a manner that operation of the valve controls fluid flow in at least a part of the fluid system. The fluid system may, e.g., be a vapour compression system, such as a refrigeration system, a heat pump or an air condition system. The valve may, e.g., be an expansion valve.

The valve comprises a first valve part and a second valve part being arranged movably relative to each other. This may be achieved by mounting the first and/or the second valve part in a manner which allows it/them to move relative to the remaining parts of the valve. Thus, the first valve part may be movable while the second valve part is mounted in a fixed manner. As an alternative, the second valve part may be movable while the first valve part is mounted in a fixed manner. Finally, both of the valve parts may be movably mounted. In all of the situations described above a relative movement between the first valve part and the second valve part is possible, thereby defining a mutual position of the first valve part and the second valve part. The relative movements may, e.g., be rotational or substantially linear. In the case that the relative movements are rotational, the valve parts may advantageously be in the form of substantially circular disks which are arranged in such a manner that at least one of them can rotate about an axis extending through the centre of each of the circular disks.

The first valve part and the second valve part each has at least one opening formed therein. Accordingly, the relative position of the first valve part and the second valve part determines a relative position between opening(s) formed in the first valve part and opening(s) formed in the second valve part, including the size of a possible overlap between an opening formed in the first valve part and an opening formed in the second valve part. This overlapping area defines an opening degree of the valve, i.e. it determines a flow rate of fluid allowed to pass through the valve.

The openings may have any suitable size and shape, such as a substantially circular shape, a substantially triangular shape, a substantially quadratic shape, a substantially rectangular shape, a substantially hexagonal shape, a teardrop shape, a circle segment shape, a tapered shape, etc. The opening(s) formed in the first valve part and the opening(s) formed in the second valve part may have substantially identical size and shape, in which case the openings may be arranged on the valve parts in such a manner that it is possible to move the first and/or the second valve part to a position where an opening of the first valve part completely overlaps with an opening of the second valve part. Alternatively, at least one opening formed in the first valve part may have a size and/or shape which differs from the size and/or shape of at least one opening formed in the second valve part. In this case it is not possible to obtain an identical overlap between the two openings. However, it is still possible to define a maximum overlapping area and a minimum overlapping area between the two openings.

Thus, the mutual position of the first valve part and the second valve part determines an opening degree of the valve by means of the overlapping area as described above. Thus, the opening degree of the valve, and thereby the amount of fluid medium allowed to pass the valve, can be adjusted by adjusting the mutual position of the first valve part and the second valve part.

According to the method of the invention the first valve part and/or the second valve part is/are moved from a position defining a maximum opening degree of the valve, i.e. a maximum possible overlap between corresponding openings of the valve parts, towards a position defining a minimum opening degree of the valve. The minimum opening degree may, e.g., be a position in which there is no overlap between an opening of the first valve part and an opening of the second valve part. In this case the minimum opening degree corresponds to a closed position of the valve. Alternatively, the minimum opening degree may be a position where an overlap between corresponding openings is present, but the overlapping area is as small as possible. Accordingly, the valve parts are moved from a position defining a 'fully open' state of the valve towards a position defining a 'fully closed' or 'almost closed' state of the valve, i.e. the movement is a 'closing movement' of the valve.

The relative movement is performed in such a manner that the velocity of the relative movement varies as a function of an overlapping area between an opening of the first valve part and an opening of the second valve part. The velocity varies in such a manner that the velocity is decreased as the overlapping area decreases.

Thereby the first and/or the second valve part is/are moved relatively fast in the beginning of the closing movement, where a relatively large overlapping area is defined between corresponding openings of the first valve part and the second valve part, and the velocity of the movement is decreased towards the end of the closing movement, where the overlapping area must be expected to be significantly smaller. Thus, the relatively high velocity is applied in the part of the movement where water hammering is not expected to be a problem, and the lower velocity is only applied in the part of the movement which is expected to give rise to water hammering. Thereby a balance between operating the valve as promptly as possible while avoiding water hammering to the greatest possible extent is obtained. This is an advantage.

The velocity of the relative movement between the first valve part and the second valve part may vary stepwise as a function of the overlapping area. According to this embodiment, the velocity may initially be maintained at a first, relatively high level, and the velocity may be changed abruptly to a second, significantly lower, level when the overlapping area reaches a predefined level, and the velocity may then be maintained at this second level for the rest of the closing movement. Additionally, further velocity levels may be added between the first velocity level and the second velocity level, thereby making each change in velocity level smaller and causing a smoother transition from the first velocity level to the second velocity level.

The predefined overlapping area is within the interval from 40% to 80% of a maximum overlapping area, such as within the interval from 50% to 70% of a maximum overlapping area, and may be such as approximately 60% of a maximum overlapping area. The maximum overlapping area defines the 'fully open' state of the valve, and it should therefore be sufficiently large to allow a flow of fluid to pass the openings of the valve parts through the overlapping area without any significant restrictions. It is expected, that as long as the overlapping area is at least 40% of the maximum overlapping area, the fluid flow is still allowed to pass the valve without any significant restrictions. However, when the overlapping area reaches this level, pressure pulses, i.e. water hammering, may occur if the relative velocity is maintained at the relatively high level. It is therefore desirable to lower the velocity to $v_2$ when the overlapping area reaches this level. However, depending on the design of the valve, in particular the size and shape of the openings formed in the first valve part and the second valve part, and the size of the maximum overlapping area, it may be necessary to select a predefined overlapping area which is larger in order to ensure that water hammering is avoided. Similarly, it may be possible to maintain the higher velocity until a smaller overlapping area is reached without experiencing water hammering.

The method may further comprise the step of increasing the relative velocity after the position defining a minimum opening degree has been reached. According to this embodiment, the valve part(s) is/are once again moved fast when the valve has reached its closed position, i.e. when the risk of water hammering occurring is no longer present. After the valve part(s) has/have reached the position defining the closed position of the valve, the valve part(s) may be moved towards the next position where opening of the valve can be initiated. This movement can be performed at the high velocity without risking that water hammering occurs, and this allows the valve to be operated even more promptly. Furthermore, opening of the valve can also be performed at the high relative velocity. Thus, according to this embodiment, the relative velocity between the first valve part and the second valve part is only decreased during a very limited time while the actual closing of the valve is taking place. Thereby the overall operation of the valve is performed at as high a velocity as possible with due consideration to avoiding water hammering.

The relative movement between the first valve part and the second valve part is performed in a stepwise manner. This may advantageously be achieved by means of a stepper motor. According to this embodiment, the 'relative velocity' may be regarded in a broad sense, e.g. in terms of 'waiting time' at a position before the valve part(s) is/are moved another step to the subsequent position. Such a waiting time determines how fast the valve part(s) is/are moved from an initial position to an end position, via a number of steps, and it therefore represents a 'velocity' for this movement.

The velocity of the relative movement between the first valve part and the second valve part may further be dependent upon a required mass flow of refrigerant through the valve. In the case that the load on the refrigeration system requires a large amount of refrigerant to be supplied to the evaporator, thereby requiring a large mass flow of refrigerant through the expansion valve, it is necessary to move the valve part(s) relatively fast in order to ensure proper operation of the valve. This may lead to an increase in pressure pulses and associated noise, but it may be necessary to accept this under these circumstances. On the other hand, when the load on the refrigeration system requires a smaller amount of refrigerant to be supplied to the evaporator, thereby requiring a smaller mass flow of refrigerant through the expansion valve, the fast movement of the valve part(s) is of less importance, and more time is therefore available for closing the valve in a manner which prevents water hammering. Thus, the balance between operating the valve in a prompt manner and avoiding water hammering may be adjusted in accordance with the required mass flow of refrigerant through the expansion valve.

According to one embodiment, the second valve part may comprise one opening being fluidly connected to a supply of fluid medium, and the first valve part may comprise at least two openings, each of the openings of the first valve part being fluidly connected to one of at least two parallel flow paths. In this case the method may further comprise the step of distributing fluid medium among the at least two parallel flow paths by performing relative movements between the first valve part and the second valve part.

The at least two parallel flow paths may be at least two evaporators arranged fluidly in parallel, or at least two refrigerant flow conduits of the same evaporator, the flow conduits being arranged fluidly in parallel.

Since, according to this embodiment, fluid medium is distributed among the at least two parallel flow paths by performing relative movements between the first valve part and the second valve part, the fluid medium is distributed among the flow paths either before or during expansion of the fluid medium. Accordingly, during distribution, the fluid medium is in an at least partly liquid state. This is in particular an advantage in the case that the flow paths are in the form of microchannels of an evaporator and the fluid medium is a refrigerant, because the microchannels are only capable of accommodating a small volume of refrigerant, and there is therefore a risk that the refrigerant 'boils off' too early if the refrigerant is distributed among the flow paths while it is in a substantially gaseous phase, i.e. after expansion has taken place.

BRIEF DESCRIPTION OF THE DRAWINGS

The invention will now be described in further details with reference to the accompanying drawings in which FIGS. 1a and 1b show a first valve part and a second valve part being suitable for performing the method according to an embodiment of the invention, the openings of the valve parts having a substantially circular shape, FIGS. 2a-2f illustrate relative movements of the first valve part and the second valve part of FIGS. 1a and 1b, FIGS. 3a and 3b show a first valve part and a second valve part being suitable for performing the method according to an embodiment of the invention, the openings of the valve parts having a tapered shape, FIGS. 4a-4e illustrate relative movements of the first valve part and the second valve part of FIGS. 3a and 3b.

DETAILED DESCRIPTION OF THE PREFERRED EMBODIMENTS

Figure 4C:
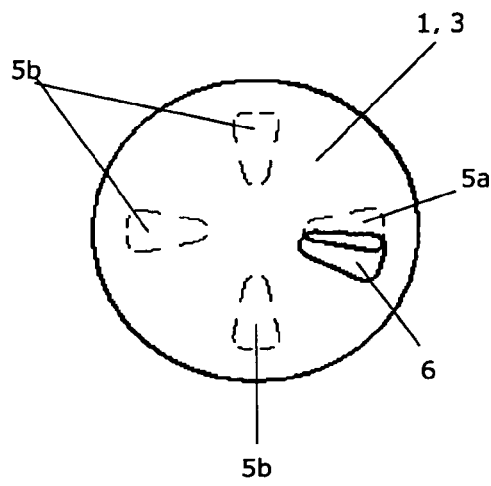

FIG. 1a shows a first valve part 1 for use in a valve being suitable for performing the method according to an embodiment of the invention. The first valve part 1 is in the form of a substantially circular disk, and it has four openings 2, each having a substantially circular cross section, formed therein as trough-going bores extending through the disk.

FIG. 1b shows a second valve part 3 for use in a valve being suitable for performing the method according to an embodiment of the invention. The second valve part 3 is in the form of a substantially circular disk having a diameter which is substantially identical to the diameter of the first valve part 1 of FIG. 1a. Accordingly, the first valve part 1 of FIG. 1a and the second valve part 3 of FIG. 1b are adapted to form part of the same valve and to cooperate in defining an opening degree of the valve. This will be described in further detail below with reference to FIGS. 2a-2f.

The second valve part 3 is provided with an opening 4 in the form of a through-going bore extending through the disk. The opening 4 has a substantially circular cross section, and the diameter of the circular opening 4 is substantially identical to the diameter of each of the openings 2 of the first valve part 1 of FIG. 1a.

FIGS. 2a-2f illustrate relative movements of the first valve part 1 of FIG. 1a and the second valve 3 part of FIG. 1b. The first valve part 1 and the second valve part 3 are arranged adjacently in such a manner that circular surfaces of the disks substantially overlap, thereby defining a common centre. One or both of the valve parts 1, 3 is/are adapted to perform rotational movements about a rotational axis extending through the common centre, in such a manner that relative rotational movements between the first valve part 1 and the second valve part 3 are performed.

In FIG. 2a the first valve part 1 and the second valve part 3 are arranged relative to each other in such a manner that the opening 4 of the second valve part 3 completely overlaps with one of the openings 2a of the first valve part 1. Thereby a flow passage is defined through the valve parts 1, 3 by the opening 2a of the first valve part 1 and the opening 4 of the second valve part 3. The size of the flow passage is defined by the size of each of the openings 2a, 4, due to the complete overlap between the openings 2a, 4. Thus, in FIG. 2a the size of the flow passage is the maximum possible, and therefore this mutual position of the first valve part 1 and the second valve part 3 defines a maximum opening degree of the valve. A flow path connected to the flow passage defined by the overlap of the openings 2a, 4 will thereby receive a maximum flow of fluid.

In all of FIGS. 2a-2f there is no overlap between the opening 4 of the second valve part 3 and any of the remaining openings 2b of the first valve part 1. Accordingly, no fluid is allowed to pass into flow paths connected to these openings 2a, and the valve may, thus, be regarded as closed towards these flow paths.

In FIG. 2b the mutual position of the first valve part 1 and the second valve part 3 has been changed slightly. Thus, the overlap between the opening 2a of the first valve part 1 and the opening 4 of the second valve part 3 is no longer complete. Accordingly, the size of the flow passage defined by the overlapping openings 2a, 4 has been decreased as compared to the situation illustrated in FIG. 2a. However, the flow passage is still relatively large, allowing a significant fluid flow to pass through the flow passage.

In FIG. 2c the mutual position of the first valve part 1 and the second valve part 3 has been changed further, and the overlap between the opening 2a of the first valve part 1 and the opening 4 of the second valve part 3 has been decreased further. The overlapping area is now reduced to approximately 30% of the maximum overlapping area defined by the openings 2a, 4 in the mutual position of the valve parts 1, 3 shown in FIG. 2a.

In FIG. 2d the mutual position of the first valve part 1 and the second valve part 3 has been changed even further, and the overlap between the openings 2a, 4 has been decreased even further. The overlapping area is now very small, but a flow passage is still defined. Thus, fluid medium is still allowed to pass through the flow passage towards a flow path connected thereto, but at a very low flow rate. Accordingly, the valve is still in an open position, even though the opening degree is very small.

In FIG. 2e the mutual position of the first valve part 1 and the second valve part 3 has been changed even further. In FIG. 2e the opening 2a of the first valve part 1 and the opening 4 of the second valve part 3 are arranged immediately adjacent to each other. Thus, no overlap is defined by the openings 2a, 4, no fluid flow is allowed through the openings 2a, 4, and the valve has just reached its closed position.

In FIG. 2f the mutual position of the first valve part 1 and the second valve part 3 has been changed even further. The opening 4 of the second valve part 3 is arranged in a position between two of the openings 2a, 2b of the first valve part 1, i.e. it is not arranged overlappingly with any of the openings 2 of the first valve part 1. Accordingly, no fluid is allowed to pass the valve, and the valve is therefore still in a closed position. The opening 4 is on its way towards the next opening 2b of the first valve part 1, and when it reaches the next opening 2b an overlap will be defined, thereby opening the valve towards a flow path connected to that opening 2b.

As described above, in the positions shown in FIGS. 2a and 2b the overlapping area defined by the openings 2a, 4, and thereby the opening degree of the valve, is relatively large. Thereby the risk of water hammering occurring at these positions is very limited. However, when the mutual position of the first valve part 1 and the second valve part 3 is changed from the position shown in FIG. 2c to the position shown in FIG. 2e, via the position shown in FIG. 2d, water hammering may occur if the movement is performed too fast. In accordance with the present invention the movements illustrated in FIGS. 2a-2f may therefore advantageously be performed in the following manner. The relative movement of the valve parts 1, 3 from the position shown in FIG. 2a to the position shown in FIG. 2c, via the position shown in FIG. 2b, is performed at a relatively high velocity, thereby ensuring acceptable response times and proper operation of the valve.

When the position shown in FIG. 2c is reached, the velocity of the relative movement between the first valve part 1 and the second valve part 3 is reduced, either abruptly or gradually. Thus, the relative movement of the valve parts 1, 3 from the position shown in FIG. 2c to the position shown in FIG. 2e, via the position shown in FIG. 2d is performed at a lower velocity than the movement from the position shown in FIG. 2a to the position shown in FIG. 2c. Thereby the risk of water hammering occurring is reduced considerably.

When the position shown in FIG. 2e is reached, and the valve is in a closed position, the velocity of the relative movement between the first valve part 1 and the second valve part 3 can be increased again, since water hammering does not occur while the valve is in a closed position. Thus, the relative movement from the position shown in FIG. 2e to the position shown in FIG. 2f is performed at the high velocity.

Changing the velocity during the closing movement of the valve ensures a correct balance between ensuring proper operation and acceptable response times of the valve, and avoiding or reducing the problems arising from water hammering.

FIGS. 3a and 3b show a first valve part 1 and a second valve part 3 for use in a valve. The first valve part 1 is provided with four openings 5 in the form of through-going bores having a tapered cross section. The second valve part 3 is provided with one opening 6 in the form of a through-going bore having a tapered cross section. Apart from the shape of the cross sections of the openings 5, 6, the valve parts 1, 3 shown in FIGS. 3a and 3b are identical to the valve parts 1, 3 shown in FIGS. 1a and 1b, and they will therefore not be described in detail here.

FIGS. 4a-4e illustrate relative movements between the first valve part 1 shown in FIG. 3a and the second valve part 3 shown in FIG. 3b. The mutual position of the valve parts 1, 3 is changed from a fully open position shown in FIG. 4a to a fully closed position shown in FIG. 4e. The remarks set forth above with reference to FIGS. 2a-2f are equally applicable here.

Figure 4D:
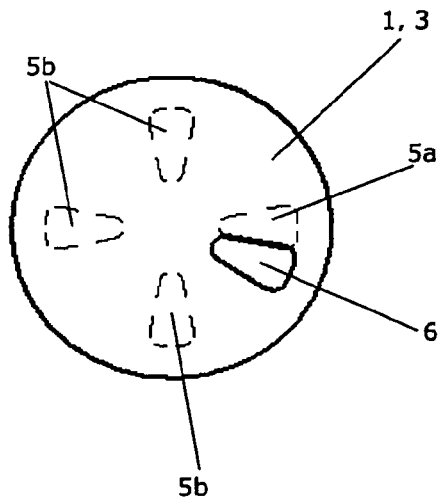
Figure 4E:
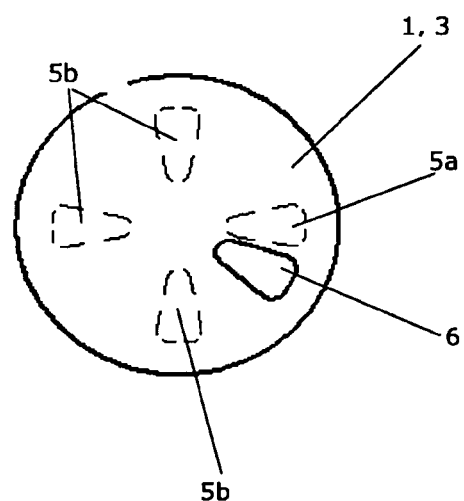

Similarly to the description above, the relative movements shown in FIGS. 4a-4e may advantageously be performed in such a manner that the relative movement from the position shown in FIG. 4a to the position shown in FIG. 4c, via the position shown in FIG. 4b, is performed at a relatively high velocity. The relative movement from the position shown in FIG. 4c to the position shown in FIG. 4d is performed at a reduced velocity, thereby avoiding or reducing water hammering. Finally, the relative movement from the position shown in FIG. 4d to the position shown in FIG. 4e, i.e. while the valve is in a closed position, is performed at the high velocity.

Figure 5:
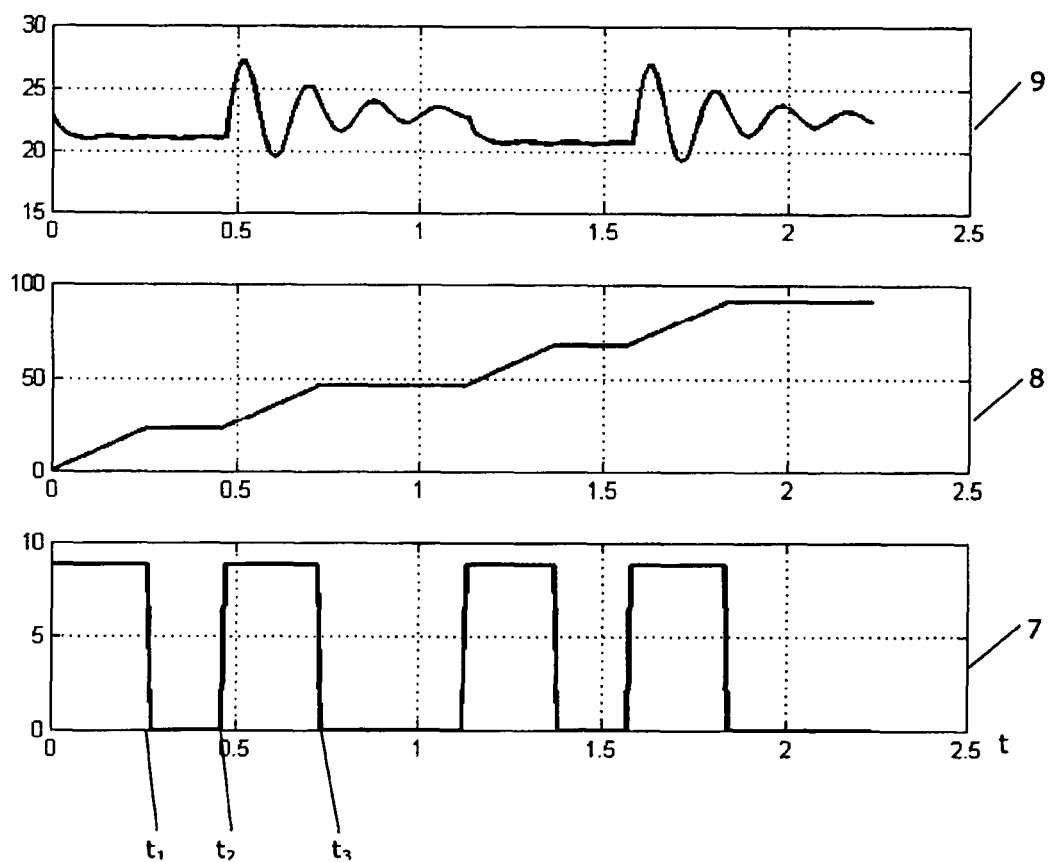
FIG. 5 shows corresponding graphs of relative velocity, relative position and pressure in the fluid medium as a function of time during relative movements of a first valve part and a second valve part in accordance with a prior art operating method.

FIG. 5 shows corresponding graphs of relative velocity 7, relative position 8 and pressure 9 in the fluid medium as a function of time during relative movements of a first valve part 1 and a second valve part 3 in accordance with a prior art operating method. The first valve part 1 and the second valve part 3 may, e.g., be of the kind shown in FIGS. 1a and 1b, or of the kind shown in FIGS. 3a and 3b.

Initially, at t=0, the relative velocity 7 of the valve parts 1, 3 is high, and the relative position 8 between the valve parts 1, 3 is changed at a constant velocity. The pressure 9 is steady. During this movement the valve is opened, i.e. it is moved to the position defining the maximum opening degree.

At $t=t_1$ the relative movement is stopped, i.e. the relative velocity 7 is zero, and the relative position 8 is unchanged, until $t=t_2$. The time elapsing from $t=t_1$ to $t=t_2$ defines how long the valve is kept open.

At $t=t_2$ the relative velocity 7 is again changed to the high value, causing the relative position 8 of the valve parts 1, 3 to change again. Thereby the closing movement of the valve is initiated. It is clear from the graph that this causes the pressure 9 of the fluid medium to oscillate violently, and these pressure oscillations continue well after the closing operation has been completed and the relative movement between the first valve part 1 and the second valve part 3 has been stopped at $t=t_3$. This is the phenomenon which is known as water hammering. It is noted that the relative movement between the first valve part 1 and the second valve part 3 is performed at substantially the same velocity throughout the closing operation as well as throughout the opening operation.

In FIG. 5 a subsequent opening operation followed by a closing operation is further illustrated.

Figure 6:
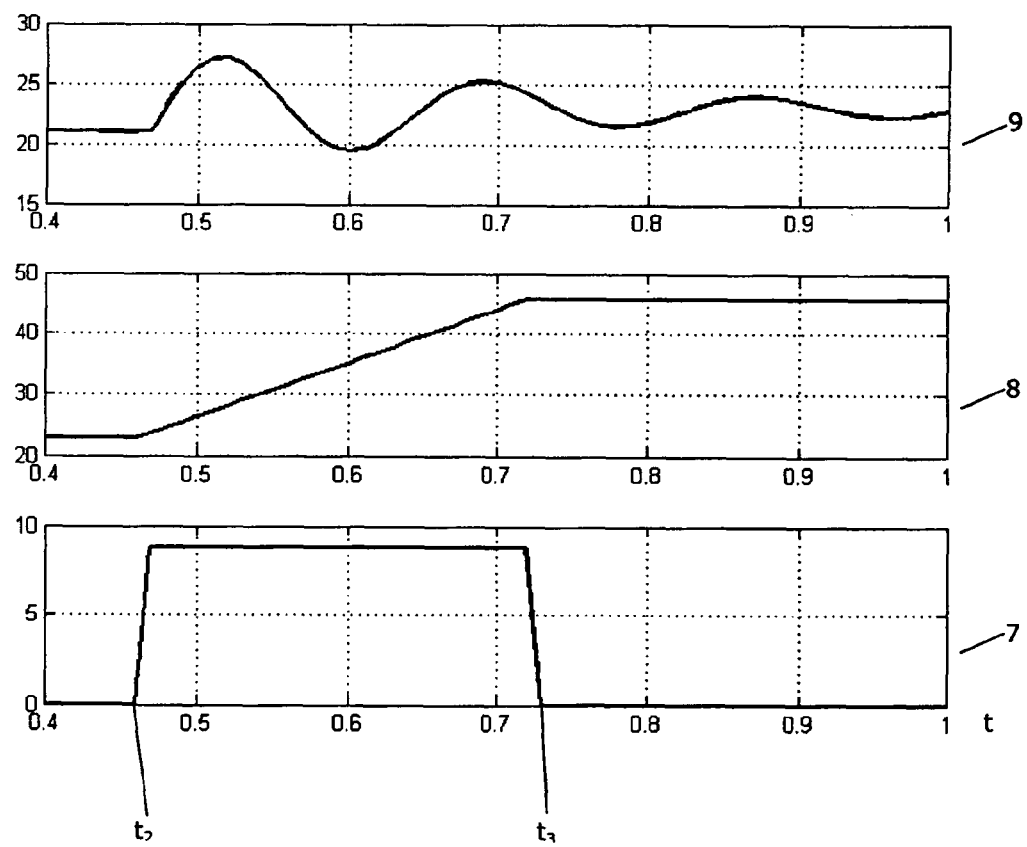
FIG. 6 shows a part of the graphs of FIG. 5 in more detail.

FIG. 6 is a zoom of the graphs of FIG. 5, illustrating the closing operation described above. In FIG. 6 it can easily be seen that the velocity 7 of the relative movement between the first valve part 1 and the second valve part 3 is maintained at a substantially constant level throughout the closing operation.

Figure 7:
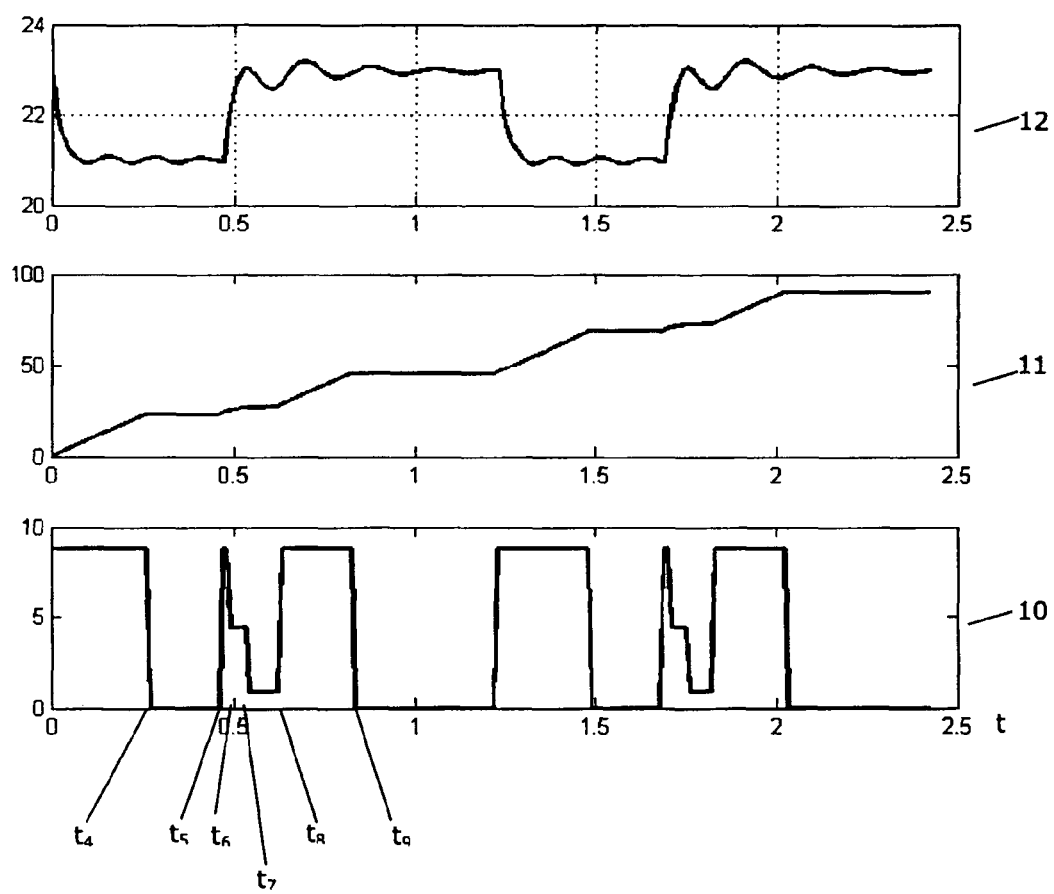
FIG. 7 shows corresponding graphs of relative velocity, relative position and pressure in the fluid medium as a function of time during relative movements of a first valve part and a second valve part in accordance with an operating method according to an embodiment of the invention.

FIG. 7 shows corresponding graphs of relative velocity 10, relative position 11 and pressure 12 in the fluid medium as a function of time during relative movements of a first valve part 1 and a second valve part 3 in accordance with an operating method according to an embodiment of the invention. The first valve part 1 and the second valve part 3 may, e.g., be of the kind shown in FIGS. 1a and 1b, or of the kind shown in FIGS. 3a and 3b.

Initially, at t=0, the relative velocity 10 between the first valve part 1 and the second valve part 3 is at a relatively high and substantially constant level. This causes the valve to be opened. At $t=t_4$ the relative velocity 10 is abruptly moved to zero, and the relative position 11 between the first valve part 1 and the second valve part 3 is maintained at a constant level until $t=t_5$. During this time the valve is in a fully open state.

At $t=t_5$ a closing operation of the valve is initiated. From $t=t_5$ to $t=t_6$ the first valve part 1 and the second valve part 3 are moved at the high relative velocity 10 which was also applied during the opening operation. At $t=t_6$ the velocity is lowered to a level which is substantially half of the high level. At $t=t_7$ the velocity 10 is lowered even further to a very low level. At $t=t_8$ the valve has been moved to a fully closed position, and the velocity 10 is once again increased to the high level, where it is maintained until $t=t_9$, where the relative movement between the first valve part 1 and the second valve part 3 is stopped.

The gradual decrease of the relative velocity 10 is reflected in the relative position 11 between the first valve part 1 and the second valve part 3. It can be seen that the graph 11 gradually flattens between $t=t_5$ and $t=t_8$.

In response to the closing operation described above, the pressure 12 of the fluid medium oscillates, similarly to the situation described above with reference to FIG. 5. However, the oscillations are not as profound, and the oscillations are damped much faster. Thus, the problems with water hammering are considerably reduced as compared to situation illustrated in FIGS. 5 and 6 where the relative movements of the first valve part 1 and the second valve part 3 are performed in accordance with a prior art method. The water hammering is reduced because the velocity 10 of the relative movement is very low during the last part of the closing operation. Furthermore, moving the valve parts 1, 3 at the high velocity during the initial part of the closing operation and when the valve is fully closed, ensures a prompt operation and an acceptable response time of the valve.

FIG. 7 further shows a subsequent opening operation of the valve, followed by another closing operation.

Figure 8:
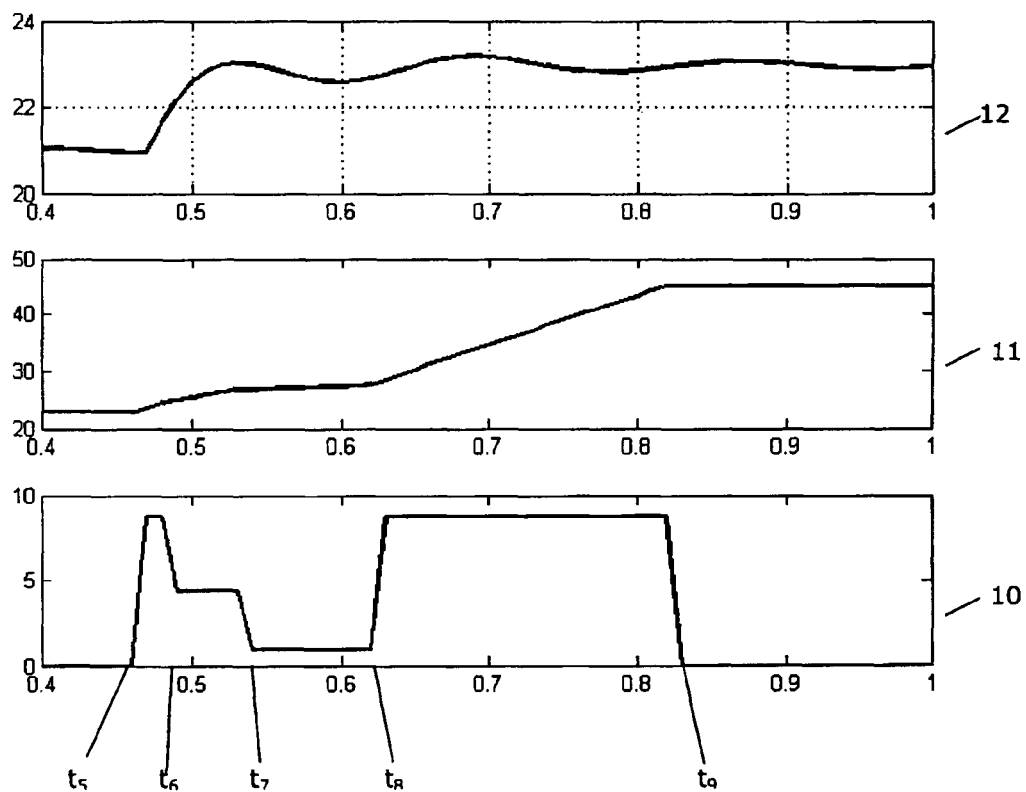
FIG. 8 shows a part of the graphs of FIG. 7 in more detail.

FIG. 8 is a zoom of the graphs 10, 11, 12 of FIG. 7, illustrating the closing operation described above from $t=t_5$ to $t=t_9$. It is very clear from the pressure graph 12 that the pressure oscillations are significantly reduced as compared to the situation shown in FIGS. 5 and 6.

Although the invention above has been described in connection with preferred embodiments of the invention, it will be evident for a person skilled in the art that several modifications are conceivable without departing from the invention as defined by the following claims.

The invention clamed is:

1. A method for operating a valve comprising a first valve part having at least one opening formed therein and a second valve part having at least one opening formed therein, the first valve part and the second valve part are each in the form of a substantially circular disk with relative movements being rotational, wherein at least one of the circular disks can rotate about an axis extending through the center of each of the circular disks, the first and second valve parts being adapted to perform relative movements, the relative position of the at least one opening of the first valve part and the at least one opening of the second valve part defining an opening degree of the valve by means of an overlapping area of the at least one opening of the first valve part and the at least one opening of the second valve part, the method comprising the steps of:

providing a required mass flow of refrigerant through the valve;

moving the first valve part and/or the second valve part from a position defining a maximum opening degree of the valve towards a position defining a minimum opening degree of the valve in such a manner that a velocity of a relative movement between the first valve part and the second valve part varies as a function of the overlapping area between the at least one opening of the first valve part and the at least one opening of the second valve part, in such a manner that the velocity is decreased as the overlapping area decreases; and increasing the relative velocity after the position defining the minimum opening degree has been reached until the valve parts reach a fully closed position where no relative movement occurs between the first valve part and the second valve part;

wherein the step of moving the first valve part and/or the second valve part comprises the steps of:

varying the velocity in a stepwise manner by moving the first valve part and/or the second valve part at a first relative velocity ($v_1$) until a predefined overlapping area is reached; and subsequently moving the first valve part and the second valve part at a second relative velocity ($v_2$) until the overlapping area is zero, the valve thereby being in a closed position;

wherein the second relative velocity ($v_2$) is significantly lower than the first relative velocity ($v_1$); and wherein the predefined overlapping area is within the interval from 40% to 80% of a maximum overlapping area;

wherein the first relative velocity ($v_1$) and/or the second relative velocity ($v_2$) are/is set dependent upon the required mass flow of refrigerant through the valve.

2. The method according to claim 1, wherein the second valve part comprises one opening being fluidly connected to a supply of fluid medium, and the first valve part comprises at least two openings, each of the openings of the first valve part being fluidly connected to one of at least two parallel flow paths, the method further comprising the step of distributing fluid medium among the at least two parallel flow paths by performing relative movements between the first valve part and the second valve part.

3. The method according to claim 1, wherein the step of increasing the increased relative velocity comprises moving the first valve part and/or the second valve part such that the increased relative velocity during opening of the valve is substantially equal in magnitude to the first relative velocity.

* * * * *